Figure 1:
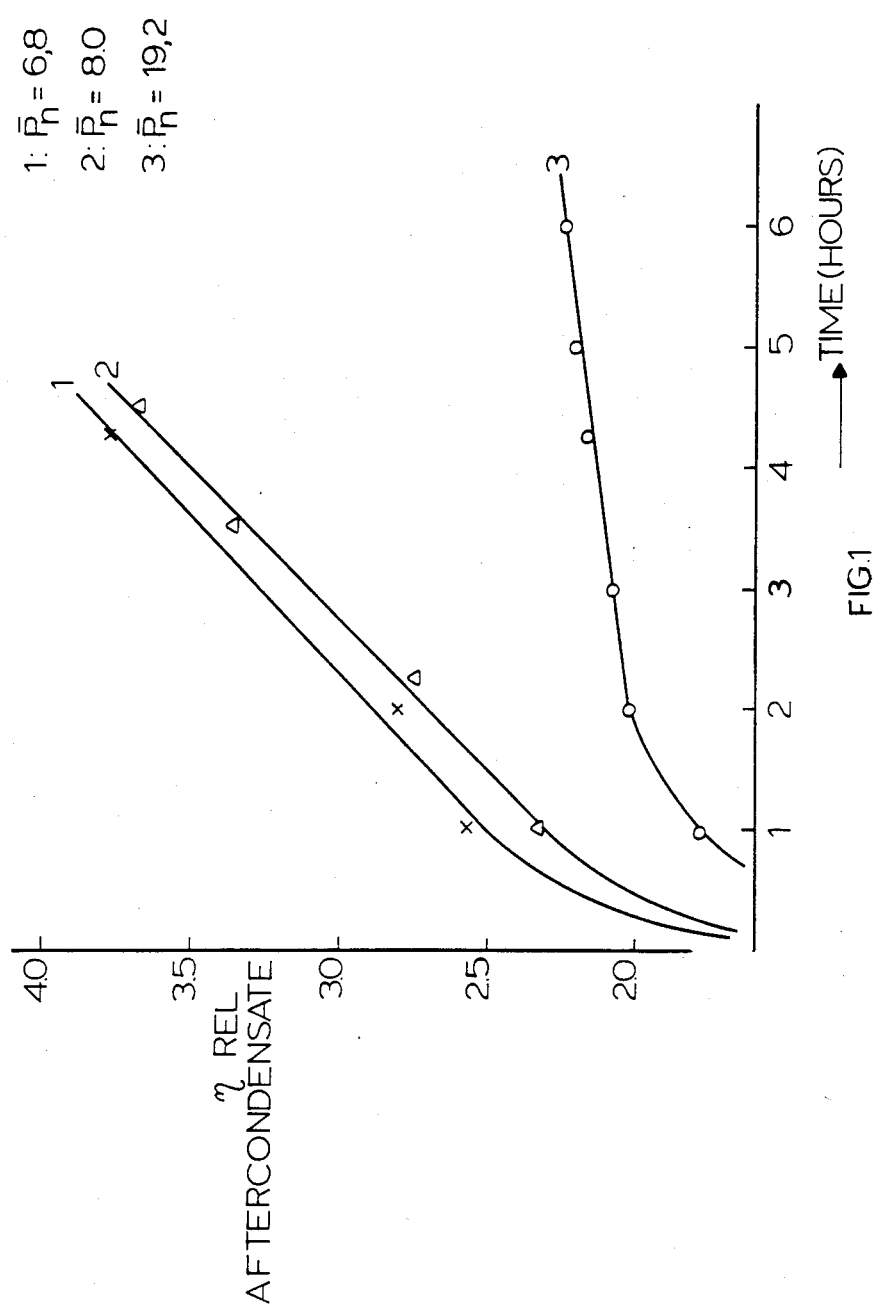

United States Patent [19]

Roerdink et al.

[11] Patent Number: 4,722,997

[45] Date of Patent: Feb. 2, 1988

[54] PROCESS FOR THE PREPARATION OF NYLON 4,6

[75] Inventors: Eize Roerdink, Beek; Jean M. M. Warnier, Urmond, both of Netherlands

[73] Assignee: Stamicarbon, B.V., Geleen, Netherlands

[21] Appl. No.: 889,385

[22] Filed: Jul. 25, 1986

Related U.S. Application Data

[63] Continuation-in-part of Ser. No. 776,589, Sep. 16, 1985, abandoned.

[30] Foreign Application Priority Data

May 31, 1985 [NL] Netherlands ............................ 8501566

[51] Int. Cl.$^4$ ........................ C08G 69/28; C08G 69/30
[52] U.S. Cl. .................................... 528/335; 525/420; 528/336
[58] Field of Search ................. 528/335, 336; 525/420

[56] References Cited

U.S. PATENT DOCUMENTS 4,408,036 10/1983 Gaymans et al. .................... 528/335
4,460,762 7/1984 Gaymans et al. .................... 528/335

*Primary Examiner*—Harold D. Anderson
*Attorney, Agent, or Firm*—Cushman, Darby & Cushman

[57] ABSTRACT

A reproducible method for the preparation of high molecular weight white poly(tetramethyleneadipamide) nylon 4,6 using moderate temperatures and relatively short reaction times is disclosed. In the method, the prepolymerization step is limited under controlled reaction conditions so that a prepolymer is formed with a very low degree of polymerization, whereby a shorter, commercially viable, after-condensation time is achieved to obtain a high molecular weight final polycondensation polymer product.

8 Claims, 3 Drawing Figures

PROCESS FOR THE PREPARATION OF NYLON 4,6

RELATED APPLICATIONS

This application is a continuation-in-part of application Ser. No. 776,589 filed Sept. 16, 1985, now abandoned.

This invention relates to an improvement in the processes for the preparation of white, high molecular weight, poly(tetramethyleneadipamide), nylon 4,6. By the process of this invention, the prepolymerization step is limited under controlled reaction conditions so that a prepolymer is formed with only a very low degree of polymerization, whereby a shorter, commercially viable, aftercondensation time is achieved to obtain a high molecular weight final polycondensation polymer product in a substantially reproducible manner.

While the preparation of polyamides has been known for over forty years, such polyamides, have generally only been nylon 6,6, nylon 6, and nylon 6,10. In particular, nylon 4,6 was not commercially known, and in previous years was only formed as a laboratory material of known discolored characteristics and unsatisfactory polymerization. See Gaymans et al., J. Poly Sci 15, 537-545 (1977); Gaymans et al., ACS Symposium Series No. 104, 137-48 (Polym. React. Processes) (1979).

Since the appearance of U.S. Pat. Nos. 4,408,036, 4,446,304, and 4,460,762, and certain related other publications, it has now become known that a white high molecular weight poly(tetramethyleneadipamide) could be prepared through the use of a two-stage process. In the first stage, known as the prepolymerization stage, the salt of 1,4-diaminobutane and adipic acid was heated in the presence of an excess of 1,4-diaminobutane over a period of several hours at temperatures ranging from 150° to 310° C. Subsequently, in the second aftercondensing stage, the prepolymer was heated at a temperature of between 225° and 275° C. in, for instance, a fluidized bed or a rotating drum for at least about four hours, while in the presence of water vapor and an inert atmosphere, and preferably at nearly atmospheric pressure. The examples of these above-mentioned patents indicate that according to the procedures there used and the temperatures employed, total reaction times of about eight hours were required for the combined prepolymerization and aftercondensation stages in order to obtain a satisfactory, useful high molecular weight product.

An article in the Journal of Polymer Science 15, 537-545 (1977) described a procedure wherein by selection of the temperature of the aftercondensation stage of between 290° and 350° C., and performing such aftercondensation stage under vacuum, the process could be accelerated and polyamides of high molecular weight could be obtained. These polymers were, however, discolored by undesired side reactions which were themselves enhanced under the circumstances of that published technique. The danger in the use of high temperatures, even in the presence of excess diaminobutane in the prepolymerization stage and/or of water vapor during the aftercondensation stage, lies in the high sensitivity of the product to low concentrations of contaminants, for instance traces of oxygen, which easily cause the unacceptable discoloration. An article in Polymer Communications, 25, 194-195 (1984), indicated the difficulty of determining the reaction kinetics for the prepolymerization stage.

While it is generally desirable to execute the combined polycondensation reactions, both the prepolymerization and the aftercondensation stages, at moderate temperatures, and at the same time seek a minimization of the total reaction time with avoidance of undesired side reactions, while also seeking to maximize the production capacity of the plant with a high reproducibility of product characteristics resulting from the process, achieving all of those goals simultaneously has proven to be a difficult task.

It is the principal object of this invention to provide a reproducible method for the preparation of high molecular weight white poly(tetramethyleneadipamide) using moderate temperatures and relatively short reaction times.

The process according to the present invention now provides for the reproducible production of high molecular weight white poly(tetramethyleneadipamide) consisting substantially of repeat chain units of $$-[NH-(CH_2)_4-NH-CO-(CH_2)_4-NH]-$$

whereby the preparation is effected through the heating, in a first prepolycondensation stage of a salt of 1,4-diaminobutane and adipic acid, or the salt thereof, in the presence of a controlled excess of 1,4-diaminobutane, at a temperature which is controlled between 180° and 240°; subsequently, the thus-formed prepolymer is aftercondensed in the solid phase at a temperature controlled within the range of 225° to 275° to form a high molecular weight polyamide; and wherein, in particular, the number average degree of polymerization achieved in the first prepolymerization stage is maintained at a level between 5.0 and 18, while the reactor contents therein are also maintained in a liquid state through maintaining the presence of a sufficient quantity of water to achieve that goal, and also with termination of the prepolymerization reaction by the technique of discharging the liquid reaction mass from the reactor under the autogenous pressure developed therein during the prepolymerization reaction. The aftercondensation reaction is then conducted in the solid phase at a temperature between 225° and 275° C. in the presence of an inert atmosphere which also contains water vapor, and preferably at about atmospheric pressure, so that there is obtained a high molecular weight poly(tetramethyleneadipamide) product having a degree of polymerization such as to exhibit a relative viscosity of at least 2.5 dl/g, advantageously at least 2.8 dl/g, as determined in a solution of 1 g of polyamide and 100 ml of 96 weight percent sulfuric acid at 25° C.

The number average degree of polymerization referred to above is defined as the average number of diaminobutane and of adipic acid units per molecule of polymer. Thus, according to this definition, a molecule which contains "x" units of the salt of 1,4-diaminobutane and adipic acid in the chain has in fact a number average degree of polymerization, $\bar{P}_n$ equal to $2\times$. $\bar{P}_n$ can be derived from endgroup analysis according to the equation:

$$\bar{P}_n = \frac{2000}{(a + c + p) \cdot 99}$$

In this equation,
a = amino end group content, as meq/g c = carboxylic end group content, as meq/g
p = the cyclic end group content, as meq/g
99 = the molecular weight of the tetramethylene adipamide repeat unit (198) divided by 2

The end group contents a and c may be determined by titration as is described in Journal of Polymer Science 15, 537–45 (1977). The cyclic end group content p may be determined according to the method described in U.S. Pat. No. 4,408,036.

A special characteristic of the process provided by the present invention is that the prepolymerization stage is controlled so as to limit the extent of the polycondensation reaction in such a manner that the prepolymer is obtained having only a relatively low degree of polymerization. Even though a low degree of polymerization is thus effected in this first liquid phase reaction, surprisingly the resulting prepolymer, when made under the conditions set forth, requires only a considerably shorter time in the solid phase aftercondensation stage than would be required to obtain a substantially identical final high molecular weight product from a prepolymer which itself had already possessed a relatively higher degree of polycondensation. Thus, unexpectedly, by decreasing the time for the prepolymerization stage, under the stated reaction conditions, there is also achieved a decrease in the required time for the aftercondensation stage, even though other reaction conditions comparable to known processes are employed, and consequently a significant shortening of the total reaction time.

On the other hand, it has also been found in the investigations leading to this invention that if the prepolymerization stage is conducted such that the degree of polymerization achieved therein is limited to too low a degree, the otherwise beneficial effect on the reaction velocity for the aftercondensation state is substantially nullified and at the same time a high possibility of lump formation in the solid phase aftercondensation stage reactor also exists.

Therefore, according to the present invention, the prepolymerization stage must be effected at a temperature of between 180° and 240°, advantageously between 190° and 220° C., while observing the other stated additional reaction conditions. The reaction will be carried out in a closed reactor under the elevated autogenous pressure which thereby develops.

The starting material may be either diaminobutane and adipic acid added as such, or the combined salt thereof, along with excess diaminobutane. Up to 20 wt. % of other polyamide co-monomers may also be present such as are known to be useful including aliphatically-saturated lactams such as caprolactam, valerolactam, undecalactam and laurolactam, and amino carboxylic acids, and aliphatic and aromatic dicarboxylic acids, such as succinic acid, sebacic acid, isophthalic acid and terephthalic acid, and aliphatically-saturated diamines, such as particularly hexamethylene diamine or 1,4 aminomethylcyclohexane. The final product will still contain at least 80% of repeat units derived from 1,4 butane diamine and adipic acid. As used hereinafter, the term "nylon 4,6" shall be understood as including such co-polymers.

It is also advantageous that the prepolymerization stage is conducted in the liquid phase to obtain the additional benefit that a substantially homogeneous heat transfer into the reaction mass is facilitated which permits a more rapid heating up of the reactor contents and apparently a more uniform product. In view of the relatively short reaction times desired in the practice of this invention, this feature also leads to a more reproducible result. For this purpose, it is desired to have present at the start of the prepolymerization stage an amount of water of from 0.1 wt. % up to as much as 50 weight percent, with respect to the combined weight quantity of the adipic acid and the aminobutane (or the salt thereof) which is employed in the reaction. Advantageously, the amount of added water is limited to 20 wt. %, although in any event the amount of water is at least sufficient to maintain the reactor contents in the liquid phase during the entire duration of the prepolymerization reaction.

The prepolymerization reaction is thus continued until the number average degree of polymerization, $\overline{P}_n$, is at least 5, but not more than 18, and is advantageously within the range of 5.5 to 16, and even more beneficially within the range of at least 6 but not more than 14. The time within which this conversion is reached depends, of course, on the particular temperature and the reaction circumstances employed in a given production cycle and it would therefore be misleading to set forth a specific time range applicable to all such reaction conditions. However, in general, the prepolymerization reaction is conducted, according to this invention, for a required period of time less than 90 minutes, generally less than 1 hour, and most advantageously less than ½ hour; such short times are found to be generally sufficient in practicing the process according to this invention.

At the end of the prepolymerization reaction, instead of cooling the reactor and obtaining the product from the prepolymerization stage in solid form in the reactor, according to the present invention the reaction is terminated by discharging the reaction mass from the reactor in liquid form under the autogenous pressure developed in the reactor. The water content therein is thus evaporated or flashed off through the expansion to atmospheric pressure. If necessary, there may be a subsequent drying step before the prepolymer is charged to the aftercondensation stage reactor. Conveniently, this discharge of the prepolymer from the reactor and expansion thereof to atmospheric pressure may be effected by spray-drying techniques or the equivalent thereof. This has the significant advantage that the prepolymer can be readily obtained in powder form.

The aftercondensation reaction is thereafter effected with the prepolymer in the solid phase (but e.g. in the form of a fluidized bed) at a temperature maintained between 225° and 275° C. until a polyamide is obtained having a high degree of polymerization indicated by a relative viscosity of at least 2.5 dl/g, advantageously at least 2.8 dl/g, as measured in a solution of 1 g in 100 ml 96 weight percent sulfuric acid at 25° C. For these higher degrees of polymerization, the determination of the degree of polymerization based upon end group content is generally lacking in precision, as the accuracy with which end group contents may be determined diminishes sharply as there is a decreasing number of end groups in a mass of polymer. Therefore, determination of the molecular weight by measurement of the relative viscosity is far more precise. It has been determined that for a relative viscosity of 2.5 dl/g, the number average degree of polymerization, $\overline{P}_n$, is of the order of magnitude of 100–150. Thus, in the practice of this invention, during the aftercondensation stage the degree of polymerization is increased by a factor of at least about 6 to 30.

The aftercondensation stage is carried out in an inert atmosphere at a pressure of from 0.001 to 10 bar desirably in the presence of a small amount of added water vapor. The water content of the inert gas atmosphere may be from 5 to 100 volume percent, preferably from 20 to 50 vol. %.

In the prepolymerization reaction, the excess of diaminobutane present can amount to up to 6 weight percent with respect to the total stoichiometric amount of diaminobutane and adipic acid. It is desirable that the diaminobutane excess be such that the prepolymer obtained from this first stage reaction contains an excess of from 0.02 to 0.70 millequivalents of amino end groups (a) per gram of prepolymer (with respect to the carboxylic acid end groups, c). More specifically, it is desirable to commence the reaction with such an excess of diaminobutane that the prepolymer obtained contains an amount of amino end groups a per gram of prepolymer in excess of the carboxylic acid end groups c at a level (a–c) of 0.10 to 0.40 millequivalents. Within those ranges, the exact best excess of diaminobutane will depend upon the particular reaction conditions employed and can readily be determined by trial experiments by those skilled in the art.

The invention may now be illustrated by the following examples and comparative examples, without however being restricted to the specific embodiment therein.

In the following examples, the prepolymerization step was effected in each instance by heating 3800 grams of the salt of 1,4 diaminobutane and adipic acid in a 10 liter autoclave to a temperature of between 190° and 210° C., in the further presence of an excess of 1.0 to 1.2 weight percent of diaminobutane. Water was also present in an amount between 5 and 10 weight percent of the reactor contents and so that the reactor contents remained in the liquid phase during the complete polymerization reaction. The prepolymerization reaction was then stopped by discharging the reaction mass from the reactor in liquid form under autogenous pressure, generally between 8 and 15 bar, at the reaction temperature and while maintaining a nitrogen atmosphere at ambient atmospheric pressure over the discharged material. This operation is conducted by use of spray-drying techniques, or the equivalent thereof to obtain a powdered prepolymer. Thereafter, in each instance, 30 grams of the prepolymer was aftercondensed at a temperature of 260° (as measured in the powder) in a rotating reactor maintained at atmospheric pressure using a gas stream deliverying a flow of 24 normal liters of nitrogen and 3 grams of water vapor per hour.

In each of the following Examples I–III and in each of the Comparative Examples A–C, the excess of amino acid end groups over carboxylic acid end groups in the prepolymer was maintained between 0.15 and 0.36 meq/g.

EXAMPLE I

The prepolymerization step was conducted at 190°–195° C. under an autogenous pressure of 8.7 bar for one hour after which the reaction was stopped as described above. A prepolymer having a degree of polymerization $\bar{P}_n$ of 6.5 was obtained. Thereafter, the aftercondensation reaction was carried out for four hours to produce a high molecular weight white nylon 4,6 product having a relative viscosity of 4.15.

COMPARATIVE EXAMPLE A

This Comparative Example was carried out under the same conditions as Example I except that autogenous pressure was 7.9 bar and the prepolymerization stage was stopped after 0.25 hours, at which point the degree of polymerization in the prepolymer $\bar{P}_n$ was 2.5. Following the four-hour aftercondensation step, conducted in the same manner as described above, the aftercondensate product had an $n_{rel}$ of only 1.67. This illustrates the adverse effect of using too short a reaction time in the prepolymerization stage.

EXAMPLE II

In this instance, two prepolymers were prepared by reaction as described above at a temperature of 210° C. and for a prepolymerization reaction time of 0.5 hours. The amount of excess diaminobutane employed was from 1.1 to 1.2% and the prepolymerization was effected in the presence of 8.5 and 5.4 weight percent of water and with an autogenous pressure of 12.9 and 11.7 bar, respectively. The aftercondensation reaction was then carried out on these prepolymer products having respective degrees of polymerization, $\bar{P}_n$, of 6.8 and 8.0. The relative viscosity of the aftercondensation product was measured at various time intervals. The results obtained are illustrated in accompanying FIG. 1 for the curves numbered 1 and 2.

COMPARATIVE EXAMPLE B

In this Comparative Example, the same reaction conditions as in Example II were employed with an autogenous pressure of 13.2 bar but the prepolymerization reaction was continued for four hours in the presence of 1.1–1.2 weight percent of excess diaminobutane and 6.7 weight percent of water. The aftercondensation reaction was conducted in the same manner, with similar sampling, and the results are illustrated on FIG. 1 in the curve numbered 3.

From these experiments, it is immediately apparent that the practice according to the present invention permits a substantial saving in total reaction time. It will also be noted that even though the degree of polymerization, $\bar{P}_n$, for runs 1 and 2 of this Example II were only 6.8 and 8.0 respectively, while $\bar{P}_n$ for the prepolymer of this Comparative Example was 19.2, nonetheless a much higher relative viscosity (higher polymer molecular weight) for the after condensate was obtained in a shorter time from the above Example II.

EXAMPLE III AND COMPARATIVE EXAMPLE C

Figure 2:
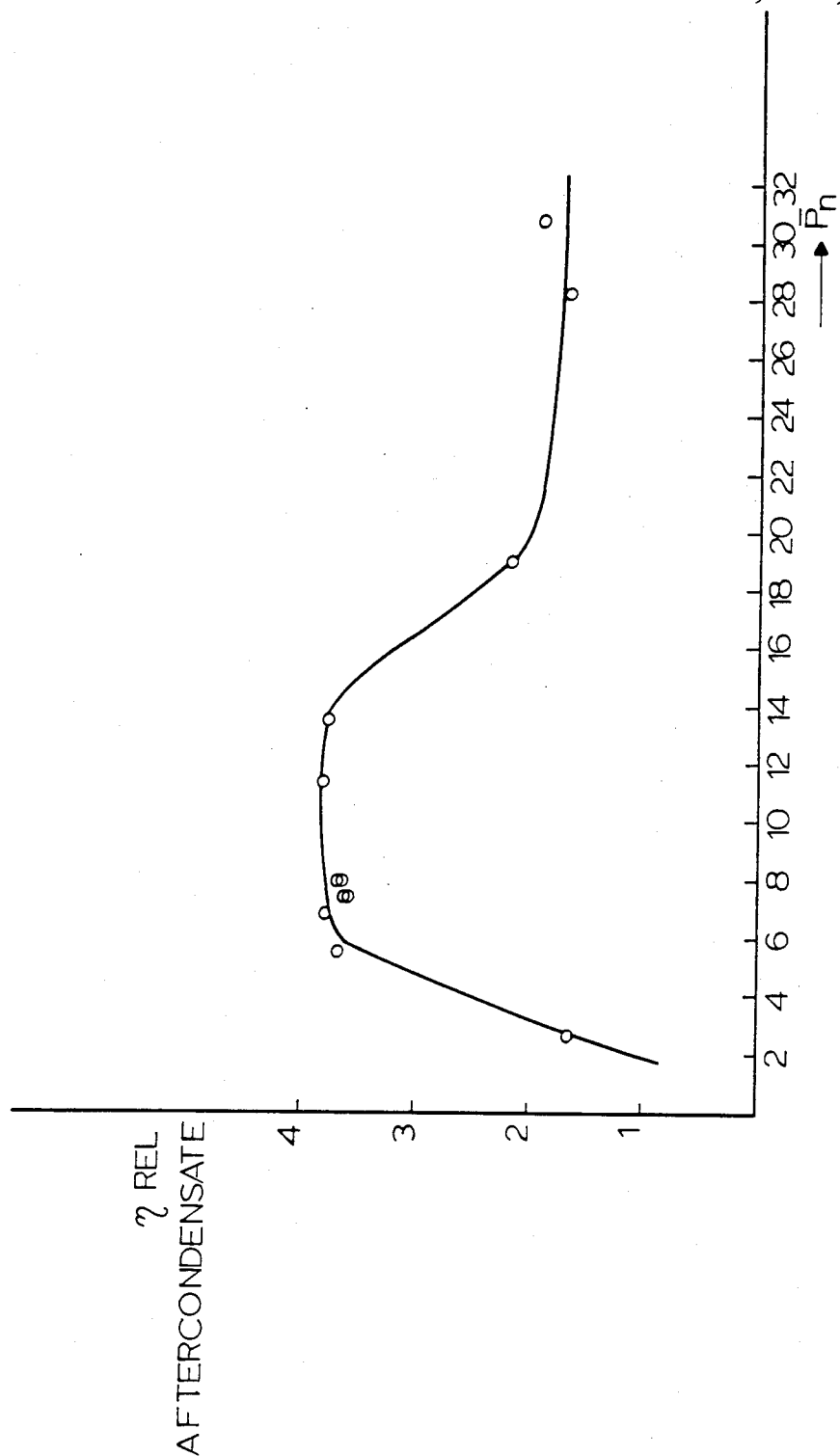

In these examples, the conditions described above were again employed for a number of prepolymers having different degrees of polymerization, $\bar{P}_n$, as indicated on the x-axis of FIG. 2. These are then plotted against the relative viscosity of the final aftercondensate polymer obtained with an after condensation time of four hours in each instance. It will again be seen here that by limiting the time and extent of prepolymerization, the aftercondensation process achieves a final product of higher relative viscosity, particularly for values of $P_n$ for the prepolymer of from about 4 up to about 18.

EXAMPLE IV AND COMPARATIVE EXAMPLE D

Figure 3:
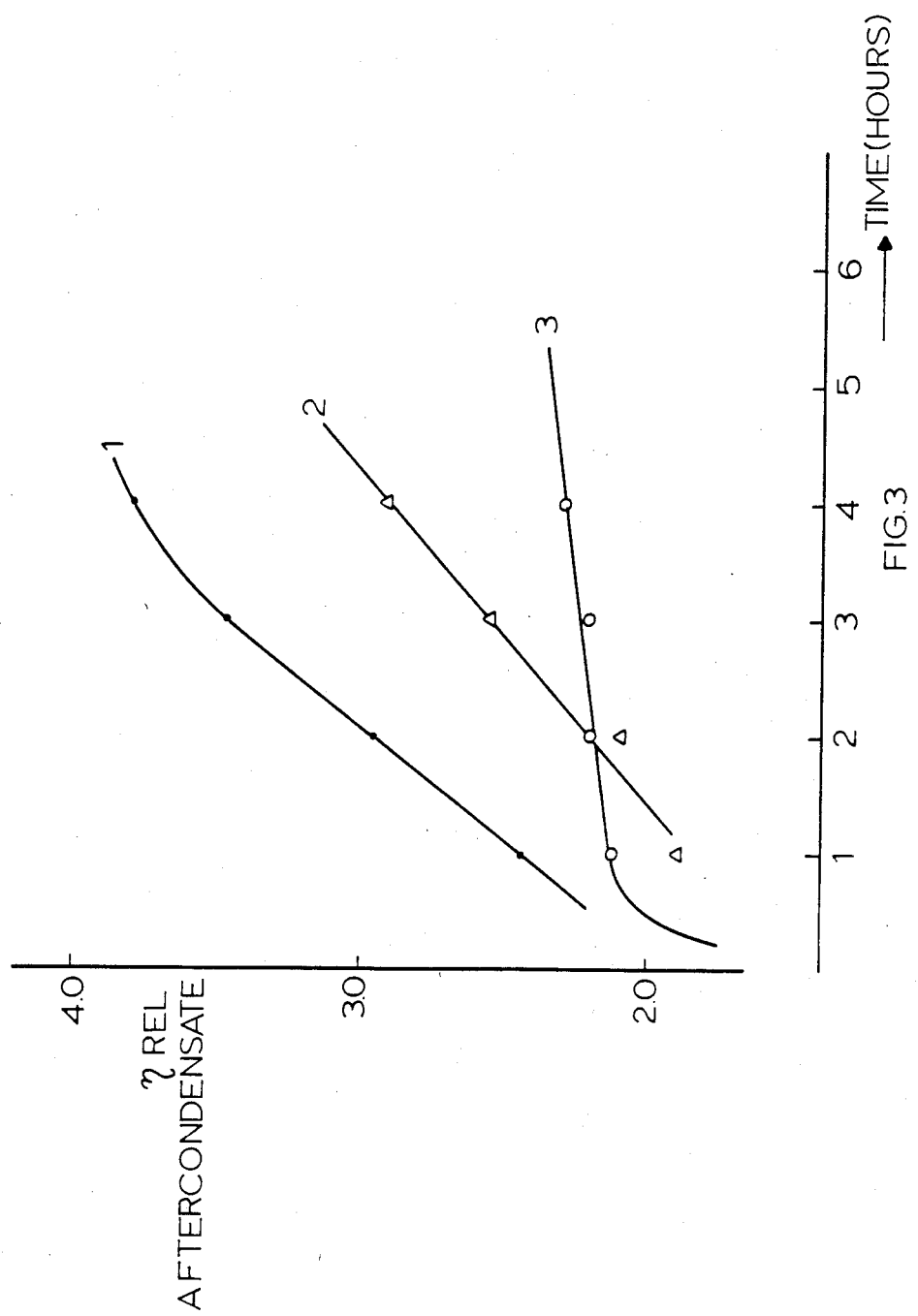

A series of prepolymers were prepared at a prepolymerization reaction temperature of 210° C. in the presence of 7.5 weight percent of water. The degree of polymerization of each of these prepolymers was of the same order of magnitude; however, the amount of excess diaminobutane was modified in order to produce a difference between the relative content of amino and of carboxylic acid end groups. These various prepolymers were then subjected to the aftercondensation reaction, and the progress of the aftercondensation stage was followed by taking samples at various times and plotting the measured resulting relative viscosity against the time of the aftercondensation reaction itself. The characteristics of the respective prepolymers are shown in Table 1 below. The aftercondensation product characteristics are illustrated in FIG. 3.

TABLE 1

| Prepolymers | $\bar{P}_n$ | (a-c) meq/g |
|---|---|---|
| 1 | 9.5 | 0.28 |
| 2 | 10 | 0.64 |
| 3 | 14.2 | 0.01 |

As these data indicate, in order to obtain an aftercondensation polymer having a relative viscosity of 3.0, more than 4 hours of aftercondensation reaction time is required if prepolymer 2 is employed (having a relatively large excess of amino groups with respect to carboxylic acid groups). On the other hand with prepolymer 1 (having a nearly identical $\bar{P}_n$ but a lower amino end group excess within the range of this invention), an aftercondensation time of only about 2 hours is required to obtain a relative viscosity of 3.0. On the other hand, if an inadequate excess of diaminobutane is employed, e.g. using prepolymer number 3, an entirely impractically long aftercondensation time would be required to obtain the relative viscosity of 3.

COMPARATIVE EXAMPLE E

This Example illustrates that the adverse effect of too high a degree of polymerization in the prepolymer on the time required for the aftercondensation reaction is intensified by the effect of an amino end group excess over carboxylic acid end group which is too high. That is, a prepolymer was prepared as described above at a reaction temperature of 210° C. and with a degree of polymerization, $\bar{P}_n$, of over 13 and with an amino end group over carboxylic acid end group of 0.44 meq/g. After a 4-hour aftercondensation reaction, conducted as described above, a final polymer was obtained with a relative viscosity of only 2.11.

This invention thus provides a method for reproducibly achieving high molecular weight, white nylon 4,6 products in much shorter total reaction times than have been hitherto realized.

The unpredictability of the results of the present invention, as against prior state of the art, may be illustrated by a review of the scattered results obtained in prior studies. For instance, in U.S. Pat. No. 4,460,762, the results of Table 1 thereof may be presented as follows (relative to the data described above in regard to the present invention):

TABLE

| | U.S. Pat. No. 4,460,762 | | | | |
|---|---|---|---|---|---|
| | Prepolymerization $n_{rel}$ | Prepolymer $\bar{P}_n$ | a-c | After condensation $n_{rel}$ | Total Time (Hrs.) |
| a | 1.20 | 12.7 | 0.319 | 4.27 | 8 |
| b | 1.19 | 13.0 | 0.420 | 4.92 | 10 |
| c | 1.20 | 12.8 | 0.51 | 3.40 | 10 |
| d | 1.22 | 19.3 | 0.10 | 3.58 | 10 |
| e | 1.30 | 23.7 | 0.24 | 6.15 | 24 |
| f | 1.16 | ? | — | 6.0 | 10 |
| g | 1.20 | ? | — | 3.37 | 8 |
| h | 1.25 | 12.9 | 0.18 | 2.36 | 8 |
| k | 1.66 | 65.5 | 0.001 | 2.75 | 8 |

In regard to this foregoing table, it should also be noted that none of these prepolymers were prepared in the presence of added water.

Further, from U.S. Pat. No. 4,408,036, the reported data from the examples thereof may be summarized as follows:

TABLE

| | U.S. Pat. No. 4,408,036 | | | | |
|---|---|---|---|---|---|
| | First Stage Temp. | Reaction State | Prepolymerization $n_{rel}$ | After condensation $n_{rel}$ | Total Time (Hrs.) |
| I | 180° C. | solid | 1.33 | 4.65 | 9 |
| II | 155-200 | solid | 1.23 | 4.90 | 8.7 |
| III | 175-207 | solid | 1.20 | 3.37 | 9 |
| IV | -250 | solid | ? | 2.85 | 10 |
| VII | 180-295 | melt | 1.66 | 2.65 | 6 |
| VIII | 180-295 | melt | 1.66 | 2.75 | 7 |
| IX | 222-295 | melt | 1.63 | 2.65 | 6 |
| X | 220 | solid | 1.49 | 1.81 | 7.7 |
| XI | 180-295 | melt | 1.49 | 1.90 | 6 |
| XII | 180-295 | melt? | 1.73 | 2.38 | 7.3 |
| XIII | 180-295 | melt | 1.64 | 2.50 | 6 |
| XIV | 180-295 | melt | 1.65 | 2.47 | 6.5 |
| XVII | 180 | solid | 1.18 | 3.25 | 8 |
| XVIII | 180 | solid | 1.20 | 2.51 | 8 |
| XIXa | 180 | solid | 1.25 | 3.45 | 6 |
| XIXb | 219 | solid | 1.09 | 2.20 | 6 |
| XIXc | 210 | solid | 1.92 | 5.71 | 6 |
| XIXd | 250 | solid | 2.03 | 2.75 | 6 |
| XIXe | 202 | solid | 1.08 | 3.75 | 6 |
| XIXf | 300 | solid | 1.62 | 2.29 | 6 |
| XIXg | 210 | solid | 1.22 | 3.14 | 6 |
| XIXh | 224 | solid | 1.28 | 3.33 | 6 |

Note:
Examples V and VI of U.S. Pat. No. 4,408,036, did not practice an after condensation reaction, and had no water addition; some of the foregoing examples had added "co-monomers", e.g. XVII, XVIII. None of these Examples produced a powdered prepolymer product. For Examples II and III, $P_n$ was 35 and 45, respectively, well outside the range for the present invention.

Reviewing the above data will indicate that there as been little consistency and little reproducibility in prior reactions, and certainly no realization of the importance of the combination of reaction condition parameters, for both stages, which has been discovered in this invention.

It will also be appreciated from the foregoing data that the present invention has a substantial advantage in that the combined reaction time for both the prepolycondensation and aftercondensation stages is now confined to a period of requiring only up to about 5 hours in order to achieve the final polycondensation product. As shown in the above examples of the invention, the two reaction stages can even be completed in a combined time of less than about four hours.

We claim:

1. A process for the production of high molecular weight white poly(tetramethylenedipamide) consisting essentially of the combination of (a) a prepolymerization stage
  wherein 1,4 diaminobutane and adipic acid, or the salt thereof are polycondensed in the liquid state,
    at a temperature maintained from 180° to 240° C., in the presence of a controlled amount of 1,4 diaminobutane of from 0.2 to 6 wt. % in excess of the stoichiometric amount thereof with respect to the amount of adipic acid,
    and an amount of water maintained at a level sufficient to keep the reactor contents in the liquid state and with said amount being from 0.1 to 50 wt. % of the reactants,
    for a required period of time of up to about 90 minutes;
  and removing the resulting liquid prepolymer from the reactor under substantially autogenous pressure and subsequently expanding the same to substantially atmospheric pressure to obtain a powdered prepolymer product having a number average degree of polymerization $\overline{P}_n$ from 5 to 18;
thereafter subjecting said prepolymer to (b) a solid phase after-condensation stage
  in an inert atmosphere containing from 5 up to about 100 vol. % water,
  at a temperature from 225° to 275° C.,
  to increase the degree of polycondensation by a factor of at least 6 to 30 and to obtain a final high molecular weight, while poly(tetramethyleneadipamide) having a $n_{rel}$ of at least 2.5 dl/g, as measured in a solution of 1 g in 100 ml 96 weight percent sulfuric acid at 25° C.,
  and wherein, in combination with the aforesaid conditions, the total combined required time for the pre-polycondensation and after-condensation stages is up to about 5 hours.

2. Process according to claim 1, in which the prepolymer $\overline{P}_n$ is between 5.5 and 16.

3. Process according to claim 2, in which the prepolymer $\overline{P}_n$ is between 6 and 14.

4. Process according to claim 1, in which the amount of water in said prepolmerization stage is between 5 and 10 wt. % of the reactants.

5. Process according to claim 1, wherein the final polycondensation product has an $n_{rel}$ of at least 2.8 dl/g.

6. Process according to claim 1, in which the amino endgroup content, in the prepolymer is at least 0.02 but not more than 0.70 meq/g above the carboxylic endgroup content.

7. Process according to claim 6, in which said amino endgroup is at least 0.10 but not more than 0.46 meq/g above the carboxylic endgroup content.

8. Process according to claim 1, wherein said total required time is up to about 4 hours.

* * * * *

UNITED STATES PATENT AND TRADEMARK OFFICE
CERTIFICATE OF CORRECTION

PATENT NO.   :   4,722,997
DATED        :   February 2, 1988
INVENTOR(S)  :   Eize Roerdink, and Jean M.M. Warnier It is certified that error appears in the above-identified patent and that said Letters Patent is hereby corrected as shown below:

Column 2, line 52, delete "and" and insert --in--;

Column 6, line 67, change "$P_n$" to read --$\overline{P}_n$--;

Column 8, line 51, change "as" to read --has--.

In The Claims:

Claim 1, column 9, line 21, change "$P_n$" to read --$\overline{P}_n$--;

column 10, line 1, change "while" to read --white--,

Signed and Sealed this

First Day of November, 1988

Attest:

DONALD J. QUIGG

Attesting Officer     Commissioner of Patents and Trademarks

UNITED STATES PATENT AND TRADEMARK OFFICE
CERTIFICATE OF CORRECTION

PATENT NO. : 4,722,997

DATED : February 2, 1988

INVENTOR(S) : Eize Roedink, and Jean M.M. Warnier

It is certified that error appears in the above-identified patent and that said Letters Patent is hereby corrected as shown below:

Column 2, lines 22-24, the formula should read line 26, delete "of a salt";
line 51, delete "dl/g", both occurrences;
Column 4, line 52, delete "dl/g";
line 53, delete "dl/g";
line 63, delete "dl/g".

Claim 1, column 10, line 2, delete "dl/g";

Claim 5, column 10, line 17, delete "dl/g".

Signed and Sealed this

Seventh Day of January, 1992

*Attest:*

HARRY F. MANBECK, JR.

*Attesting Officer*      *Commissioner of Patents and Trademarks*